United States Patent [19]

Truong et al.

[11] Patent Number: 5,444,489
[45] Date of Patent: Aug. 22, 1995

[54] VECTOR QUANTIZATION VIDEO ENCODER USING HIERARCHICAL CACHE MEMORY SCHEME

[75] Inventors: Kwan K. Truong, Norcross; Russell M. Mersereau, Atlanta, both of Ga.

[73] Assignee: Georgia Tech Research Corporation, Atlanta, Ga.

[21] Appl. No.: 16,813

[22] Filed: Feb. 11, 1993

[51] Int. Cl.$^6$ .......................... H04N 7/30; H04N 7/32
[52] U.S. Cl. ....................................... 348/422; 348/408
[58] Field of Search ........ 348/417, 418, 699, 411–412, 348/408, 416, 414, 422, 700; H04N 7/12, 7/133, 7/137

[56] References Cited

U.S. PATENT DOCUMENTS

| | | | |
|---|---|---|---|
| 4,558,350 | 12/1985 | Murakami | 348/417 |
| 4,710,812 | 12/1987 | Murakami et al. | 348/699 |
| 4,821,119 | 4/1989 | Gharavi | 358/136 |
| 4,845,560 | 7/1989 | Kondo et al. | 358/133 |
| 4,849,810 | 7/1989 | Ericsson | 358/133 |
| 4,862,264 | 8/1989 | Wells et al. | 358/138 |
| 4,873,573 | 10/1989 | Thomas et al. | 358/133 |
| 4,951,138 | 8/1990 | Henot | 348/429 |
| 4,951,140 | 8/1990 | Ueno et al. | 358/136 |
| 5,122,873 | 6/1992 | Golin | 358/133 |
| 5,128,754 | 7/1992 | Dhein | 358/105 |
| 5,132,792 | 7/1992 | Yonemitsu et al. | 358/136 |
| 5,142,361 | 8/1992 | Tayama et al. | 348/416 |
| 5,144,423 | 9/1992 | Knauer et al. | 358/133 |
| 5,150,209 | 9/1992 | Baker et al. | 358/133 |
| 5,155,594 | 10/1992 | Bernstein et al. | 348/412 |
| 5,194,950 | 3/1993 | Murakami et al. | 348/418 |
| 5,218,687 | 6/1993 | Ducousso et al. | 395/425 |
| 5,247,357 | 9/1993 | Israelsen | 348/418 |
| 5,296,927 | 3/1994 | Guillotel | 348/699 |
| 5,305,389 | 4/1994 | Palmer | 382/1 |
| 5,317,397 | 5/1994 | Okaka et al. | 348/699 |

OTHER PUBLICATIONS

Puri, A. et al., "Adaptive schemes for motion-compensated coding," *SPIE*, vol. 1001 Visual Communications and Image Processing '88, pp. 925–934.

Vaisey, D. J. et al., "Variable Block-Size Image Coding," *IEEE*, 1987, pp. 1051–1054.

Bentley, J. L. et al., "A Locally Adaptive Data Compression Scheme," *Communications of the ACM*, vol. 29, No. 4, Apr. 1986, pp. 320–330.

Feng, Y. et al., "A Self-Organizing Adative Vector Quantization Technique," *Journal of Visual Communication and Image Representation*, vol. 2, No. 2, Jun. 1991, pp. 129–137.

Sullivan, G. J. et al., "Efficient Quadtree Coding of Images and Video," *IEEE*, 1991, pp. 2661–2664.

Saito, T. et al., "A Vector Quantizer with Short-Time Memory for Digital Image Coding," *IEEE*, 1988, pp. 217–221.

Primary Examiner—Tommy P. Chin
Assistant Examiner—Vu Le
Attorney, Agent, or Firm—Hopkins & Thomas

[57] ABSTRACT

A system compresses image blocks via successive hierarchical stages and motion encoders which employ caches updated by stack replacement algorithms. Initially, a background detector compares the present image block with a corresponding previously encoded image block and if similar, the background detector terminates the encoding procedure by setting a flag bit. Otherwise, the image block is decomposed into smaller present image subblocks. The smaller present image subblocks are each compared with a corresponding previously encoded image subblock of comparable size within the present image block. When a present image subblock is similar to a corresponding previously encoded image subblock, then the procedure is terminated by setting a flag bit. Alternatively, the present image subblock is forwarded to a motion encoder where it is compared with displaced image subblocks, which are formed by displacing previously encoded image subblocks by motion vectors that are stored in a cache, to derive a first distortion vector. When the first distortion vector is below a first threshold $T_M$, the procedure is terminated and the present image subblock is encoded by setting flag bit and a cache index corresponding to the first distortion vector. Alternatively, the present image subblock is passed to a block matching encoder where it is compared with other previously encoded image subblocks to derive a second distortion vector. When the second distortion vector is below a second threshold $T_m$, the procedure is terminated by setting a flag bit, by generating the second distortion vector, and by updating the cache.

46 Claims, 9 Drawing Sheets

RASTER SCANNING

VECTOR QUANTIZATION VIDEO ENCODER USING HIERARCHICAL CACHE MEMORY SCHEME

FIELD OF THE INVENTION

The present invention generally relates to digital data compression, and more particularly, to a vector quantization (VQ) video encoder with a hierarchical structure and cache memory for efficiently compressing data to thereby reduce the bit rate of a source signal.

BACKGROUND OF THE INVENTION

A common objective of all source encoding techniques is to reduce the bit rate of some underlying source signal for more efficient transmission and/or storage. The source signals of interest are usually in digital form. Examples of these are digitized speech samples, image pixels, and a sequence of images. Source encoding techniques can be classified as either lossless or lossy. In lossless encoding techniques, the reconstructed signal is an exact replica of the original signal, whereas in lossy encoding techniques, some distortion is introduced into the reconstructed signal, which distortion can be tolerated in many applications.

The development of digital data compression techniques for compressing visual information has become a very significant research area due to the high demand for numerous new visual applications. These new visual applications include facsimile transmission, teleconferencing, digital broadcasting, high definition television, digital storage and recording, multimedia PC, and videophones. Generally, digital channel capacity is the most important parameter in a digital transmission system because it limits the amount of data to be transmitted in a given time. In many applications, the transmission process requires a very effective source encoding technique to overcome this limitation. Moreover, the major issue in video source encoding is usually the tradeoff between encoder cost and the amount of compression that is required for a given channel capacity. The encoder cost usually relates directly to the computational complexity of the encoder. Another significant issue is whether the degradation of the reconstructed signal can be tolerated for a particular application.

Almost all the video source encoding techniques achieve compression by exploiting both the spatial and temporal redundancies (correlation) inherent in the visual source signals. Numerous source encoding techniques have been developed over the last few decades for encoding both speech waveforms and image sequences. Consider, for example, W. K. Pratt, *Digital Image Processing*, N.Y.: John Wiley & Sons, 1978; N. S. Jayant and P. Noll, *Digital Coding of Waveforms: Principles and Applications to Speech and Video*, Englewood Cliffs, N.J.: Prentice-Hall, 1984; A. N. Netravali and B. G. Haskell, *Digital pictures: Representation and compression*, N.Y.: Plenum Press, 1988. Pulse code modulation (PCM), differential PCM (DPCM), delta modulation, predictive encoding, and various hybrid as well as adaptive versions of these techniques are very cost-effective encoding schemes at bit rates above one bit per sample, which is considered to be a medium-to-high quality data rate. However, a deficiency of all the foregoing techniques is that the encoding process is performed on only individual samples of the source signal. According to the well known Shannon rate-distortion theory described in T. Berger, *Rate Distortion Theory*, Englewood Cliffs, N.J.: Prentice-Hall, 1971, a better objective performance can always be achieved in principle by encoding vectors, rather than scalars.

Vector quantization (VQ) was introduced in the late 1970s as a source encoding technique to encode source vectors instead of scalars. VQ is described in A. Gersho, "Asymptotically optimal block quantization," *IEEE Trans. Information Theory*, vol. 25, pp. 373-380, July, 1979; Y. Linde, A. Buzo, and R. Gray, "An algorithm for vector quantization design," *IEEE Trans. Commun.*, vol. 28, pp. 84-95, January, 1980; R. M. Gray, J. C. Kieffer, and Y. Linde, "Locally optimal quantizer design," *Information and Control*, vol. 45, pp. 178-198, 1980. An advantage of the VQ approach is that it can be combined with many hybrid and adaptive schemes to improve the overall encoding performance. Further, VQ-oriented encoding schemes are simple to implement and generally achieve higher compression than scalar quantization techniques.

Most VQ-oriented encoding techniques, however, operate at a fixed rate/distortion tradeoff and thus provide very limited flexibility for practical implementation. Another practical limitation of VQ is that VQ performance depends on the particular image being encoded, especially at low-rate encoding. This quantization mismatch can degrade the performance substantially if the statistics of the image being encoded are not similar to those of the VQ.

Two other conventional block encoding techniques are transform encoding (e.g., discrete cosine transform (DCT) encoding) and subband encoding. In transform encoding, the image is decomposed into a set of non-overlapping contiguous blocks and a linear transformation is evaluated for each block. Transform encoding is described in the following publications: W. K. Pratt, *Digital Image Processing*, N.Y.: John Wiley & Sons, 1978; N. S. Jayant and P. Noll, *Digital Coding of Waveforms: Principles and Applications to Speech and Video*, Englewood Cliffs, N.J.: prentice-Hall, 1984; R. C. Gonzalez and P. Wintz, *Digital Image Processing*, Reading, Mass.: Addison-Wesley, 2nd ed., 1987. In transform encoding, transform coefficients are generated for each block, and these coefficients can be encoded by a number of conventional encoding techniques, including vector quantization. See N. M. Nasrabadi and R. A. King, "Image coding using vector quantization: a review," *IEEE Trans. Commun.*, vol. 36, pp. 957-971, August, 1986. The transform coefficients in general are much less correlated than the original image pixels. This feature offers the possibility of modeling their statistics with well defined distribution functions. Furthermore, the image is considered to be more compact in the transform domain because not all coefficients are required to reconstruct the image with very good quality. Transform encoding is also considered to be a robust technique when compared to VQ because the transformation is fixed for all classes of images.

Although meritorious to an extent, the effectiveness of transform encoding is questionable. The effectiveness depends critically on how the bits are allocated in order to encode the individual transform coefficients. This bit rate allocation problem is documented in A. Gersho and R. M. Gray, *Vector Quantization and Signal Compression*, Mass.: Kluwer Academic, 1992. This bit rate allocation problem often results in a highly complex computational strategy, especially if it is adaptive, as suggested in N. S. Jayant and P. Noll, *Digital Coding of*

*Waveforms: Principles and Applications to Speech and Video,* Englewood Cliffs, N.J.: Prentice-Hall, 1984. The numerous computations associated with the transformation and the bit rate allocation strategy can lead to a high-cost hardware implementation. Furthermore, most encoders using transform encoding operate on block sizes of at least 8×8 pixels in order to achieve reasonable encoding performance. These block sizes are very effective in encoding the low detail regions of the image, but can result in poor quality in the high detail regions, especially at low bit-rates. In this regard, see R. Clarke, *Transform Coding of Images,* N.Y.: Academic, 1985. Thus, VQ is still known to be a better technique for encoding high detail image blocks.

Finally, in subband encoding the image is represented as a number of subband (band pass) images that have been subsampled at their Nyquist rate. In this regard, see M. Vetterli, "Multi-dimensional sub-band coding: some theory and algorithms," *Signal Processing,* vol. 6, pp. 97-112, April, 1984; J. W. Woods and S. D. O'Neil, "Subband coding of images," *IEEE Trans. Acoust., Speech, Signal Processing,* vol. 34, pp. 1278-1288, October, 1986. These subband images are then separately encoded at different bit rates. This approach resembles the human visual system. Subband encoding is a very effective technique for high quality encoding of images and video sequences, such as high definition TV. Subband encoding is also effective for progressive transmission in which different bands are used to decode signals at different rate/distortion operating points.

However, a primary disadvantage of subband encoding is that the computational complexity of the bit rate allocation and the subband decomposition problem can lead to a high-cost hardware implementation. Furthermore, subband encoding is usually not very efficient in allocating bit rates to encode the subband images at low rates.

Hence, there is a heretofore unaddressed need in the art for a low bit rate source encoding system and method which are much simpler and inexpensive to implement and which exhibit better computational efficiency.

SUMMARY OF THE INVENTION

Thus, an object of the present invention is to overcome the inadequacies and problems of the prior art.

Another object of the present invention is to provide a low bit rate source encoding system and method which are much simpler and inexpensive to implement and which exhibit better computational efficiency.

Briefly described, the present invention is a hierarchical encoding system and method for efficiently compressing image blocks by using various successive hierarchical stages and by using motion encoders which employ cache memories updated by stack replacement algorithms.

A background detector initially compares the present image block with a previously encoded image block and if the present image block is substantially similar to the previously encoded image block, the background detector terminates the encoding procedure by setting a first flag bit. Otherwise, the present image block is decomposed into smaller present image subblocks. The smaller present image subblocks are compared with corresponding previously encoded image subblocks of comparable size. If the present image subblock is substantially similar to a corresponding previously encoded image subblock, then the procedure is terminated by setting a second flag bit. Alternatively, the present image subblock is forwarded to a motion encoder.

In the motion encoder, the present image subblock is compared with displaced subblocks which are formed by displacing previously encoded image subblocks by motion (displacement) vectors stored in a cache memory, to derive a first minimum distortion-motion vector. If the first minimum distortion motion vector is below a first predetermined threshold $T_M$, then the procedure is terminated and the present image subblock is encoded with a set third flag bit and a cache index corresponding to the first minimum distortion vector. Alternatively, the present image subblock is passed to a block matching encoder. If desired, the motion encoder may include a means for performing entropy encoding on the motion vectors.

In the block matching encoder, the present image subblock is compared with the previously encoded image subblocks of comparable size to derive a second minimum distortion motion vector. The block matching encoder may employ a full search of substantially all of the previously encoded image subblocks or may employ a more efficient block matching technique, for example, a log search. If the second minimum distortion motion vector is below a second predetermined threshold $T_m$, then the procedure is terminated by setting a fourth flag bit, by outputting the second minimum distortion vector, and by updating the cache memory. Otherwise, the present image subblock is passed onto the next hierarchical stage of the system.

Optionally, the present image subblock may be further decomposed into sub-subblocks, which are each passed on to other successive sets of a motion encoder followed by a block matching encoder. Finally, if the present image subblock (or sub-subblock) has still not been encoded, it is sent to a block encoder for generating an address for the present image subblock. The block encoder may be a vector quantizer, a transform encoder, a subband encoder, or any other suitable block encoder. If desired, the vector quantizer may include means for performing entropy encoding.

An advantage of the source encoding system of the present invention is that it is simple and computationally efficient, and thus is a potential candidate for low-cost hardware implementation.

Another advantage is that vector quantization can be performed by a VQ having only a small vector dimension.

Another advantage of the present invention is that a substantial amount of compression is achieved by adaptively tracking local statistics of the image being encoded via the cache memory in the motion encoders.

Another advantage is that the rate/distortion tradeoff can be varied parametrically through the predetermined thresholds. Hence, the VQ video encoder can operate at different rate/distortion tradeoff points.

Other objects, features, and advantages of the present invention will become apparent to one with skill in the art upon examination of the following drawings and the detailed description. It is intended that any additional objects, features, and advantages be incorporated herein.

BRIEF DESCRIPTION OF THE DRAWINGS

The present invention, as defined in the claims, can be better understood with reference to the following drawings.

DETAILED DESCRIPTION OF THE PREFERRED EMBODIMENT

Figure 1:
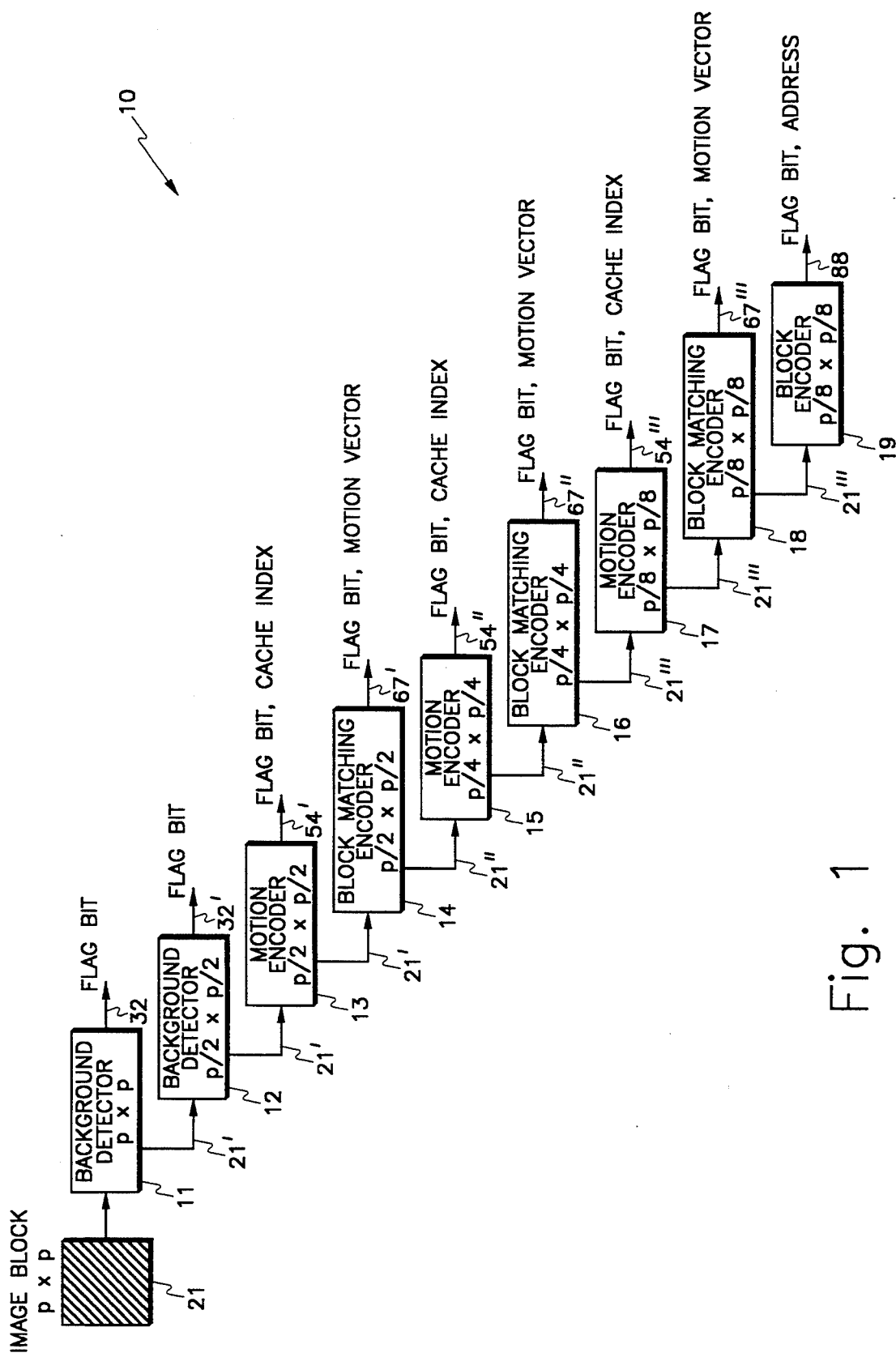
FIG. 1 is a block diagram of hierarchical source encoding system in accordance with the present invention.

With reference now to the figures wherein like numerals designate corresponding parts throughout the several views, FIG. 1 shows a hierarchical source encoding system 10 having multiple successive stages 11–19 for encoding different parts of an image block 21. In essence, higher bit rates are allocated to those regions of the image block 21 where more motion occurs, while lower bit rates are allocated to those regions where less motion occurs. The hierarchical source encoding system 10 has a low computational complexity, is simple and inexpensive to implement, and is suited for implementation in hardware, software, or combinations thereof.

In accordance with a significant aspect of the present invention, the hierarchical source encoding system 10 utilizes cache memories with stack replacement algorithms as a noiseless method to encode motion vectors. This approach has an advantage over entropy encoding because the statistics of the motion vectors are allowed to vary with time. Another major advantage of this approach is that the cache memories can substantially reduce the computation required for matching data blocks.

As shown in FIG. 1, a background detector 11 initially receives an image block 21 of size $p \times p$, for instance, $32 \times 32$ pixels. Generally, the background detector 11 determines whether the image block 21 is either a background block or a moving block. A block diagram of the background detector 11 is shown in FIG. 2.

Figure 2:
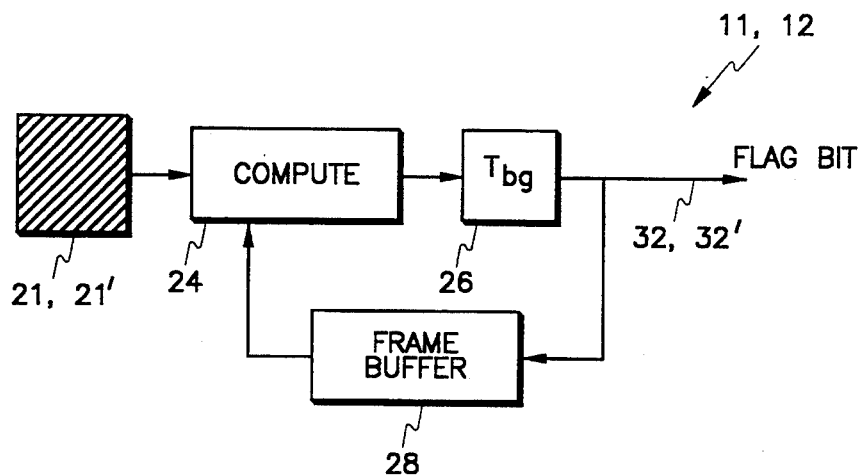
FIG. 2 is a block diagram of a background detector of FIG. 1.

With reference to FIG. 2, the background detector 11 comprises a compute mechanism 24 in series with a $T_{bg}$ flag mechanism 26, and a frame buffer 28 for receiving data from the flag mechanism 26 and for writing data to the compute mechanism 24. The frame buffer 28 can be any memory which can be randomly accessed.

In the compute mechanism 24, the image block 21 is compared with a previously encoded $p \times p$ image block (not shown) which has been stored in the frame buffer 28 in order to generate a difference value, or a "distortion" value. The distortion value is generated by comparing the blocks on a pixel-by-pixel basis. The compute mechanism 24 may utilize any suitable distortion measurement algorithm for determining the distortion value, but preferably, it employs one of the following well known distortion measurement algorithms:

Mean Square Error (MSE)
$$MSE = \frac{1}{P \times P} \sum_{i=1}^{P} \sum_{j=1}^{P} (x_{ij}(t) - x_{ij}(t-1))^2 \qquad (1)$$

Mean Absolute Error (MAE)
$$MAE = \frac{1}{P \times P} \sum_{i=1}^{P} \sum_{j=1}^{P} |x_{ij}(t) - x_{ij}(t-1)| \qquad (2)$$

Number of Moving Pixels (NMP)
$$NMP = \sum_{i=1}^{P} \sum_{j=1}^{P} \left\{ \begin{array}{l} 1 \text{ if } |x_{ij}(t) - (x)_{ij}(t-1)| > T \\ 0 \text{ otherwise} \end{array} \right\} \qquad (3)$$

The image block 21 is classified as a background block if a distortion value is less than a predetermined threshold $T_{bg}$. The comparison to the threshold $T_{bg}$ is performed in the $T_{bg}$ flag mechanism 26. If the comparison results in a difference which is less than the threshold $T_{bg}$, then a flag bit 32 is set to a logic high ("1") to thereby indicate that the present image block 21 is substantially identical to the previously encoded $p \times p$ image block and then the system 10 will retrieve another image block 21 for encoding. In the foregoing scenario, the image block 21 is encoded with merely a single flag bit 32. In the alternative, that is, if the distortion is greater than or equal to the threshold $T_{bg}$, the flag bit 32 remains at a logic low ("0") and then the system 10 will pass the $p \times p$ image block 21 on to the next hierarchical stage, that is, to the $p/2 \times p/2$ ($16 \times 16$ pixels in this example) background detector 12.

Figure 3:
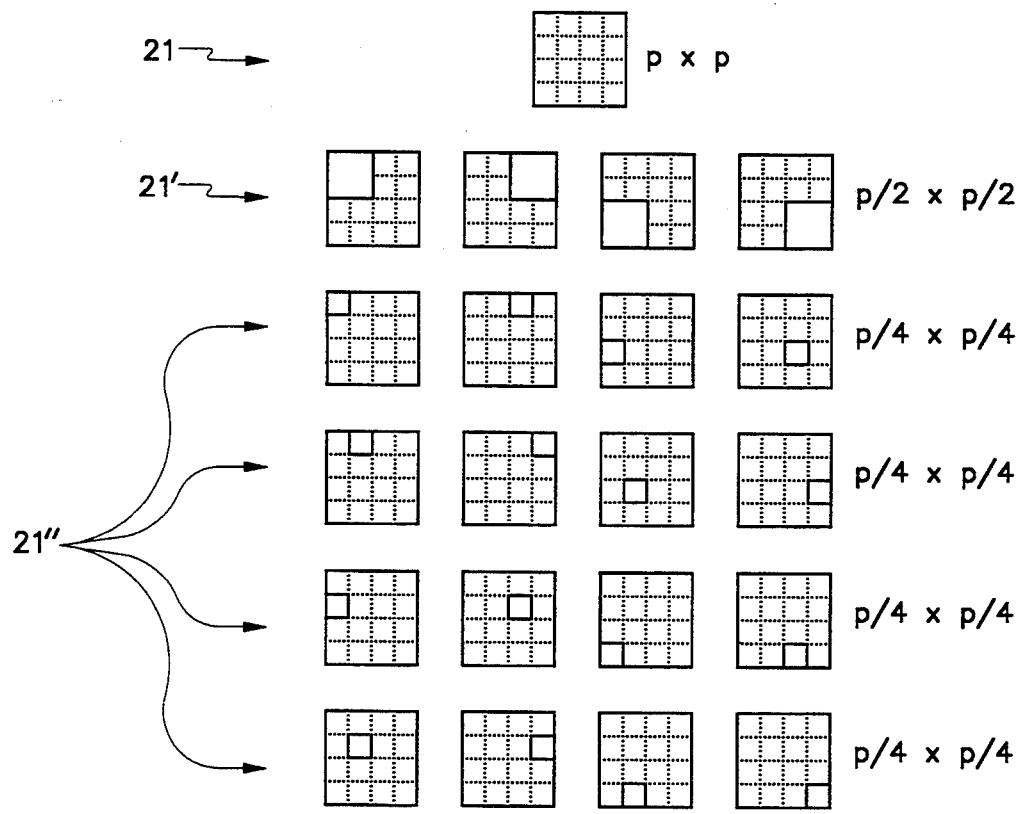
FIG. 3 is a graphical illustration showing conventional quadtree decomposition of image blocks performed by the hierarchical source encoding system of FIG. 1.

The $p/2 \times p/2$ background detector 12 has essentially the same architecture and equivalent functionality as the $p \times p$ background detector 11, as shown in FIG. 2 or a similar equivalent thereof, but the $p/2 \times p/2$ background detector 12 decomposes the $p \times p$ image block 21 into preferably four $p/2 \times p/2$ image blocks 21' via a conventional quadtree technique, prior to image analysis. A conventional quadtree decomposition is illustrated graphically in FIG. 3. As shown in FIG. 3, in conventional quadtree decomposition, a $p \times p$ block is divided into four $p/2 \times p/2$ blocks, which are individually analyzed, and then each of the $p/2 \times p/2$ blocks are broken down further into $p/4 \times p/4$ blocks, which are individually analyzed, and so on.

Thus, in the present invention, the $p/2 \times p/2$ background detector 12 retrieves a $p/2 \times p/2$ image block 21' from the four possible image blocks 21' within the decomposed $p \times p$ image block 21 residing in the frame buffer 28 and subsequently analyzes it. Eventually, all of the $p/2 \times p/2$ image blocks 21' are individually processed by the background detector 12. If the retrieved p/2×p/2 image block 21' matches with the corresponding previously encoded p/2×p/2 image block (not shown) within the frame buffer 28, then the flag bit 32' is set at a logic high to thereby encode the p/2×p/2 image block 21', and then the background detector 12 will retrieve another p/2×p/2 image block 21' for analysis, until the four of the p×p image block are exhausted. Alternatively, if the particular p/2×p/2 image block 21' at issue does not match the corresponding previously encoded p/2×p/2 image block, then the p/2×p/2 image block 21' is forwarded to the next subsequent stage of the hierarchical source encoding system 10 for analysis, that is, to the motion encoder 13.

Figure 4:
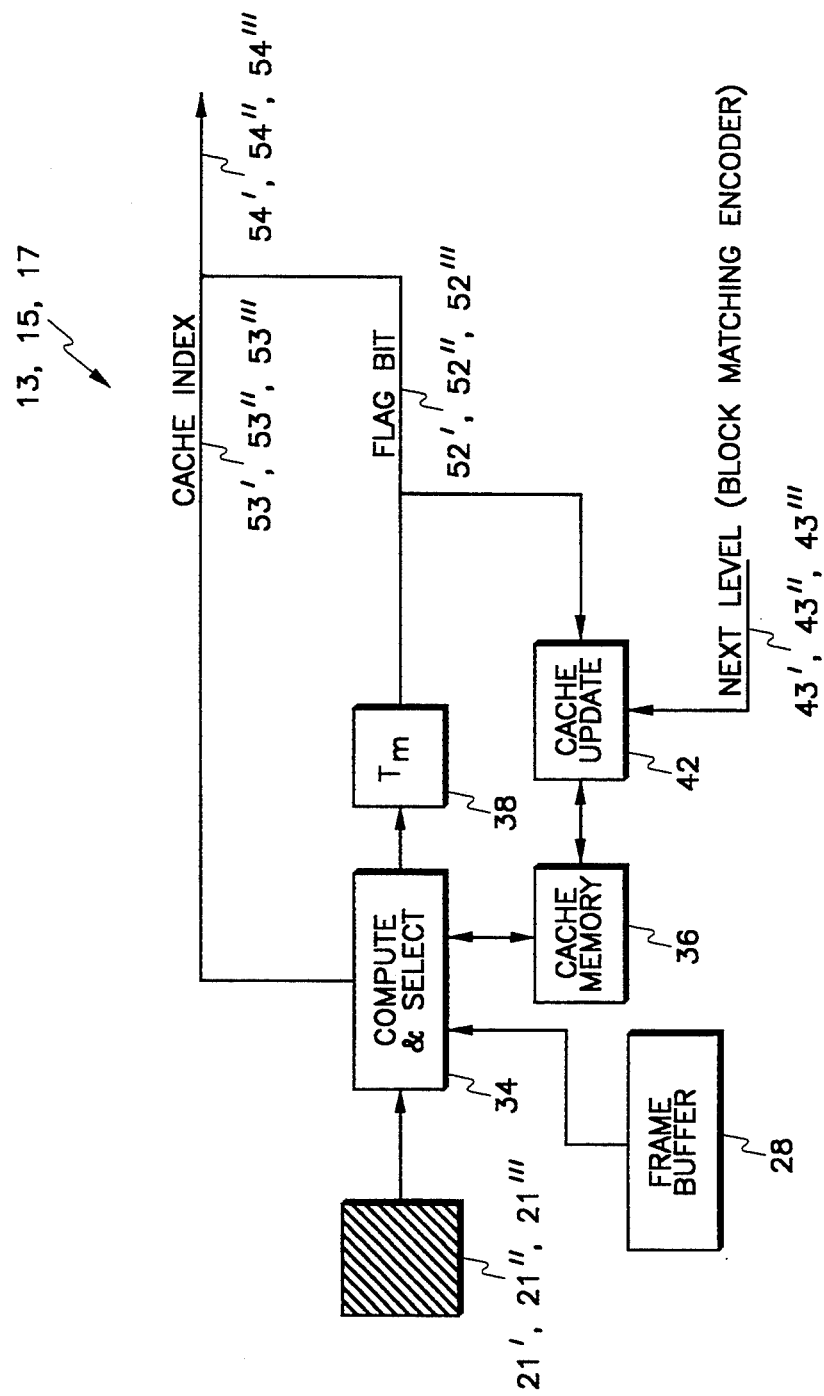
FIG. 4 is a block diagram of a motion encoder of FIG. 1.

As shown in FIG. 4, in the motion encoder 13, the p/2×p/2 image block 21' is analyzed for motion. For this purpose, the p/2×p/2 motion encoder 13 comprises a compute-and-select mechanism 34 for initially receiving the p/2×p/2 image block 33, a cache memory 36 having a modifiable set of motion vectors which are ultimately matched with the incoming image block 21', a $T_M$ threshold mechanism 38 for comparing the output of the compute-and-select mechanism 34 with a threshold $T_M$, and a cache update mechanism 42 for updating the motion code vectors contained within the cache memory 36 based upon motion information received from the next subsequent hierarchical stage, or from a block matching encoder 14, as indicated by a reference arrow 43'.

Figures 5, 6:
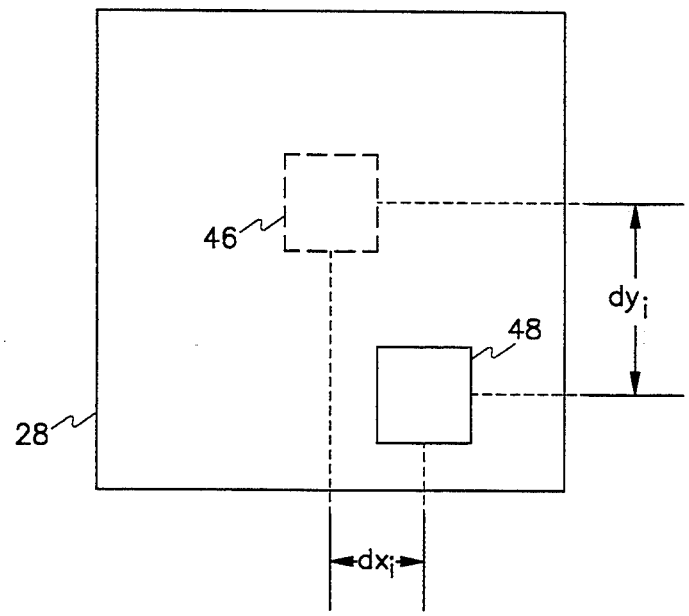
FIG. 5 is a graphical illustration showing the functionality of the compute-and-select mechanism of FIG. 4.
FIG. 6 is a graphical illustration showing the encoding of motion vectors within a cache memory of FIG. 4.

The compute-and-select mechanism 34 attempts to match the incoming p/2×p/2 image block 21' with a previously stored image block which is displaced to an extent in the frame buffer 28. The displacement is determined by a motion vector corresponding to the matching previously stored image block. Generally, motion vectors are two-dimensional integer indices, having a horizontal displacement dx and a vertical displacement dy, and are expressed herein as coordinate pairs dx, dy. FIG. 5 graphically illustrates movement of the p/2×p/2 image block 33 within the frame buffer 28 from a previous position, indicated by dotted block 46, to a present position, denoted by dotted block 48. The displacement between positions 46 and 48 can be specified by a two-dimensional displacement vector $dx_i$, $dy_i$.

The compute-and-select mechanism 34 compares the current image block 21', which is displaced by $dx_i$, $dy_i$, with the set of previously stored image blocks having code vectors in the modifiable set {$dx_0$, $dy_0$; $dx_1$, $dy_1$; ... $dx_n$, $dy_n$} within the cache memory 36. The code vectors have cache indices 0 through n corresponding with $dx_0$, $dy_0$; $dx_1$, $dy_1$; ... $dx_n$, $dy_n$. From the comparison between the current image block 21' and the previously stored image blocks, a minimum distortion code vector $d_{min}(dx_i',dy_i')$ is generated. The foregoing is accomplished by minimizing the following equation:

$$d(dx,dy) = \sum_{i=1}^{2} \sum_{j=1}^{2} [x_{ij}(t) - x_{ij}^{dx,dy}(t-1)]^2 \quad (4)$$

where x(t) is the current image block 21' corresponding to displacement vector $dx_i$, $dy_i$, where x(t−1) is the previously encoded block, and where d(dx,dy) is the distortion code vector.

Next, the minimum distortion code vector $d_{min}(dx_i',dy_i')$ is forwarded to the threshold mechanism 38, where the distortion of the minimum distortion motion vector $d_{min}(dx_i',dy_i')$ is compared with the threshold. If the distortion of the minimum distortion motion vector is less than the threshold, then the flag bit 52' is set at a logic high and the cache index 53' associated with the minimum distortion motion vector $d_{min}(dx_i',dy_i')$ is output from the compute-and-select mechanism 34. Hence, the image block 21' is encoded by the flag bit 52' and the cache index 53'. Alternatively, if the distortion of the minimum distortion motion vector $d_{min}(dx_i',dy_i')$ is greater than or equal to the threshold, then the flag bit 52' is maintained at a logic low and the p/2×p/2 image block 21' is forwarded to the next stage, that is, to the p/2×p/2 block matching encoder 14 for further analysis.

Significantly, the cache update mechanism 42 updates the cache memory 36 based on cache hit and miss information, i.e., whether the flag bit 52' is set to a logic high or low. The cache update mechanism 42 may use any of a number of conventionally available cache stack replacement algorithms. In essence, when a hit occurs, the cache memory 36 is reordered, and when a miss occurs, a motion vector which is ultimately determined by the block matching encoder 14 in the next hierarchical stage is added to the cache memory 36. When the motion vector is added to the cache memory 36, one of the existing entries is deleted.

Figure 7:
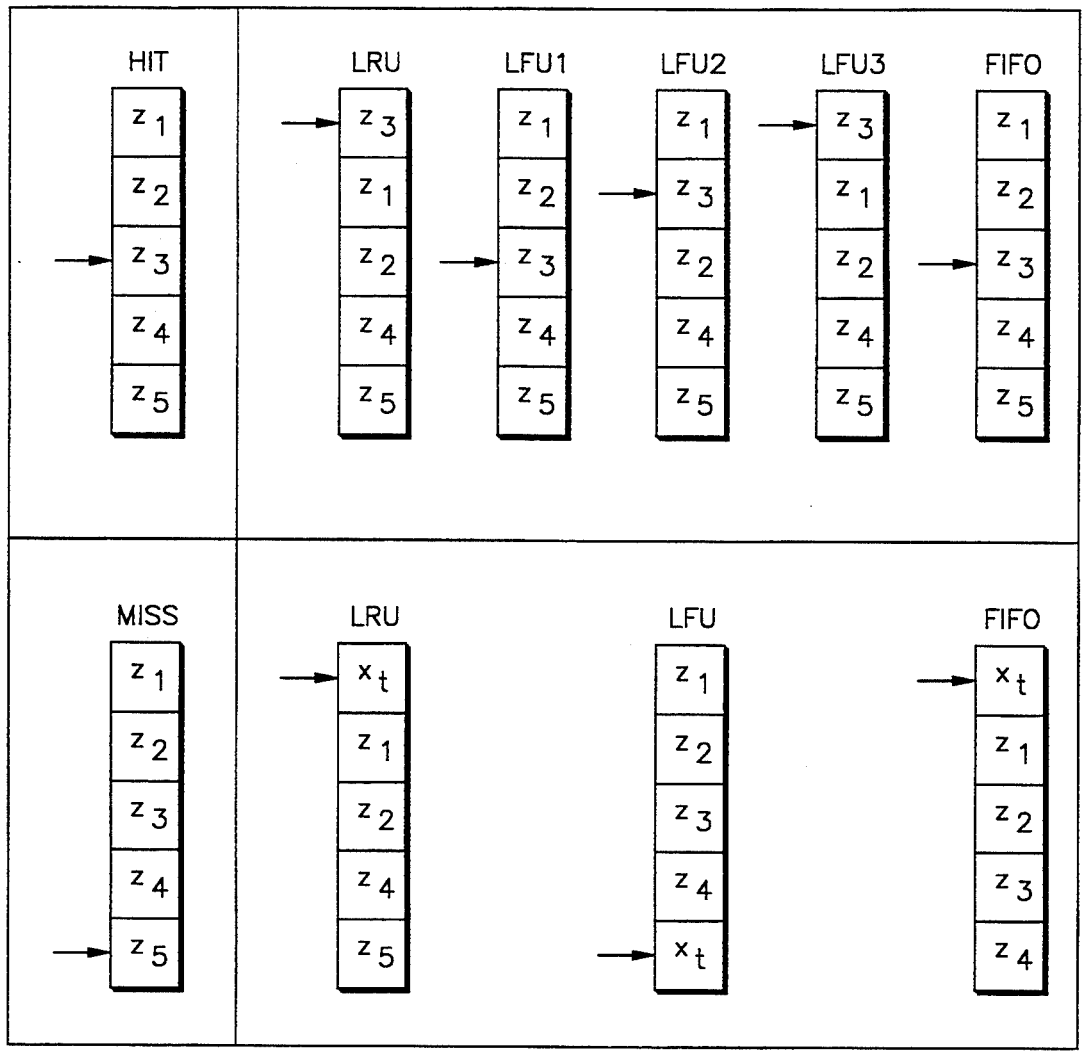
FIG. 7 is a graphical illustration showing updating processes of various cache stack replacement algorithms for the cache memory of FIG. 4.
Figure 8:
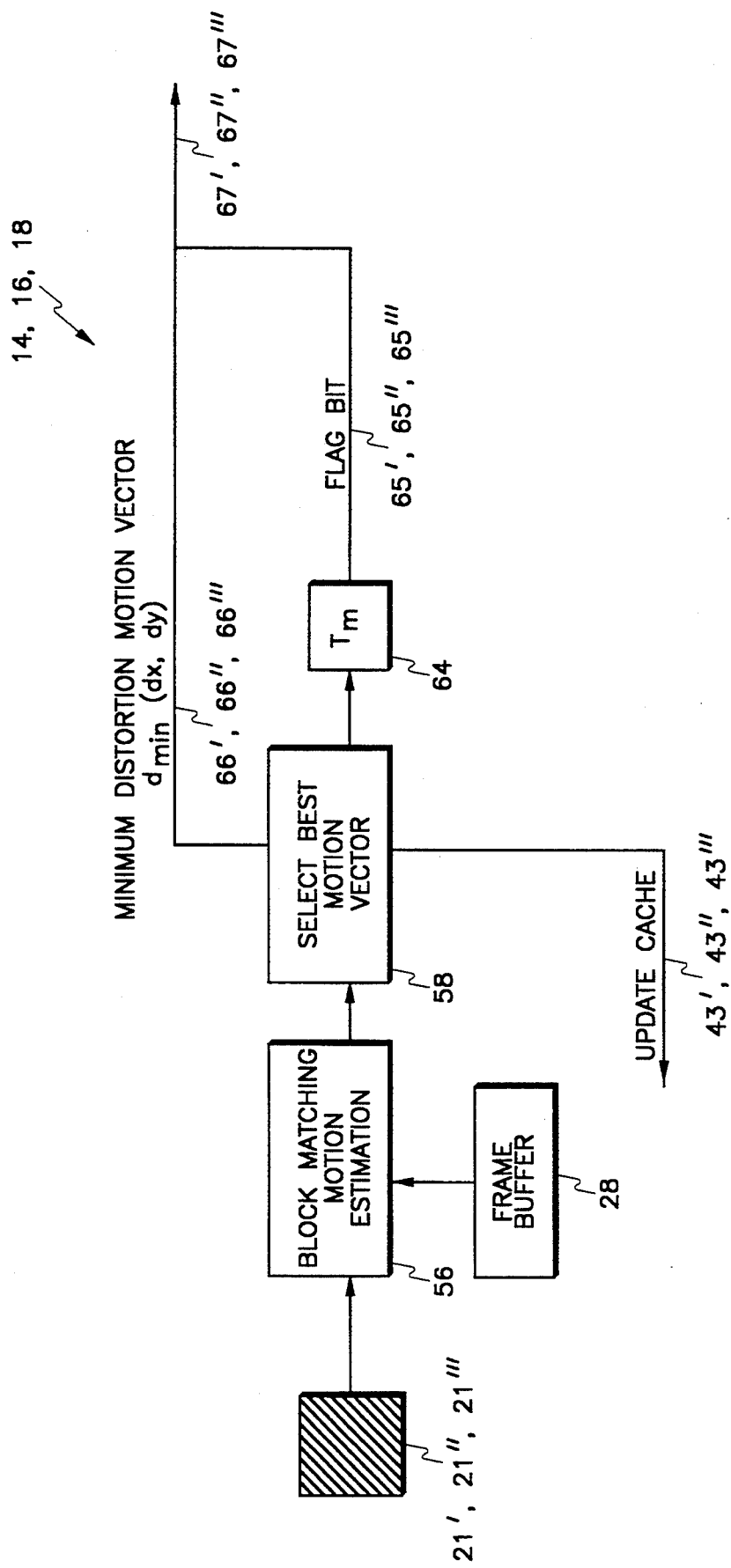
FIG. 8 is a block diagram for a block matching encoder of FIG. 1.

One of the following cache stack replacement algorithms is preferably utilized: the least-recently-used (LRU) algorithm, the least-frequently-used (LFU) algorithm, or the first-in-first-out (FIFO) algorithm. In the LRU algorithm, the motion vector to be replaced is the one whose last reference is the oldest, or has the largest backward distance. In the LFU algorithm, the motion vector to be replaced is the one whose number of references up to that time is the smallest. Finally, in the FIFO algorithm, the motion vector to be removed is the one which has been in the cache memory 36 the longest length of time. FIG. 7 illustrates and contrasts the foregoing cache update and replacement algorithms during both a cache hit and a cache miss. In accordance with the present invention, the stack replacement algorithm re-orders the index stack in the event of a cache hit, and in the event of a cache miss, an index is deleted and another index is inserted in its place.

The block matching encoder 14, which subsequently receives the p/2×p/2 image block 21' in the event of a cache miss, employs any conventional block matching encoding technique. Examples of suitable block matching encoding techniques are a full search and a more efficient log (logarithm) search, which are both well known in the art. For this purpose, the block matching encoder 14 comprises a block matching estimation mechanism 56 for comparing the incoming p/2×p/2 image block 21' with image blocks in the previously stored image frame of the frame buffer 28.

If a log search is employed, a three level approach is recommended. In other words, a predetermined set of blocks is first searched and analyzed. A best fit block is selected. Then, the neighborhood of the search is reduced, and another search of predetermined blocks ensues. In a three level search, the foregoing procedure is performed three times so that the reduction in neighborhood occurs three times.

Block comparison is performed preferably as indicated in equation (4) above, and the distortion vector d(dx,dy) that results in minimum distortion is selected. A select mechanism 58 selects the motion vector with minimum distortion, or $d_{min}(dx,dy)$, from the distortion vectors generated by equation (4) and forwards the minimum distortion vector $d_{min}(dx,dy)$ to the cache memory 36 (FIG. 5) of the motion encoder 13 (previous stage) for updating the cache memory 36.

The minimum distortion vector $d_{min}(dx,dy)$ is then compared with a predetermined threshold $T_m$ in a $T_m$ threshold mechanism 64. If the minimum distortion vector $d_{min}(dx,dy)$ is greater than the predetermined threshold $T_m$, then the flag bit 65' is maintained at a logic low, and the system 10 proceeds to the next hierarchical stage, that is, the p/4×p/4 (8×8 pixels in this example) motion encoder 15 for further analysis. If, however, the minimum distortion vector $d_{min}(dx, dy)$ is less than or equal to the predetermined threshold $T_m$, then the flag bit 65' is set at a logic high and is output along with the minimum distortion vector $d_{min}(dx,dy)$, as indicated by reference arrow 66'. Thus, in this case, the p/2×p/2 image block 21' is encoded by a flag bit 65' and the minimum distortion vector $d_{min}(dx,dy)$ 66' and the system 10 proceeds back to the background detector 12, where another p/2×p/2 image block 21' is retrieved, if available, and processed.

The image analyses which took place in the p/2×p/2 motion encoder 13 and then the p/2×p/2 block matching encoder 14, is again repeated respectively in the p/4×p/4 motion encoder 15 and then the p/4×p/4 block matching encoder 16, except on a smaller image block size of p/4×p/4 pixels. The p/4×p/4 motion encoder 15 decomposes the p/2×p/2 image block 21' into preferably four p/4×p/4 image blocks 21'' through selective scanning via the conventional quadtree technique, as illustrated and previously described relative to FIG. 3. To this end, the p/4×p/4 motion encoder 15 could encode the p/4×p/4 image block 21'', as indicated by reference arrow 54'', with a flag bit 52'' set to a logic high and a cache index 53''. Or, in the next stage, the p/4×p/4 block matching encoder 16 could encode the p/4×p/4 image block 21'', as indicated by reference arrow 67'', with a flag bit 65'' set to a logic high and a minimum distortion motion vector 66''.

The image analyses which took place in the p/4×p/4 motion encoder 15 and then the p/4×p/4 block matching encoder 16, is again repeated respectively in the p/8×p/8 (4×4 pixels in this example) motion encoder 17 and then the p/8×p/8 block matching encoder 18, except on a smaller image block size of p/8×p/8 pixels. The p/8×p/8 motion encoder 17 decomposes the p/4×p/4 image block 21'' into preferably four p/8×p/8 image blocks 21''' through selective scanning via the conventional quadtree technique, as illustrated and previously described relative to FIG. 3. To this end, the p/8×p/8 motion encoder 17 could encode the p/8×p/8 image block 21''', as indicated by a reference arrow 54''', with a flag bit 52''' set to a logic high and a cache index 53'''. Or, in the next stage, the p/8×p/8 block matching encoder 18 could encode the p/8×p/8 image block 21''', as indicated by reference arrow 67''' with a flag bit 65''' set to a logic high and a minimum distortion motion vector 66'''.

Figure 9:
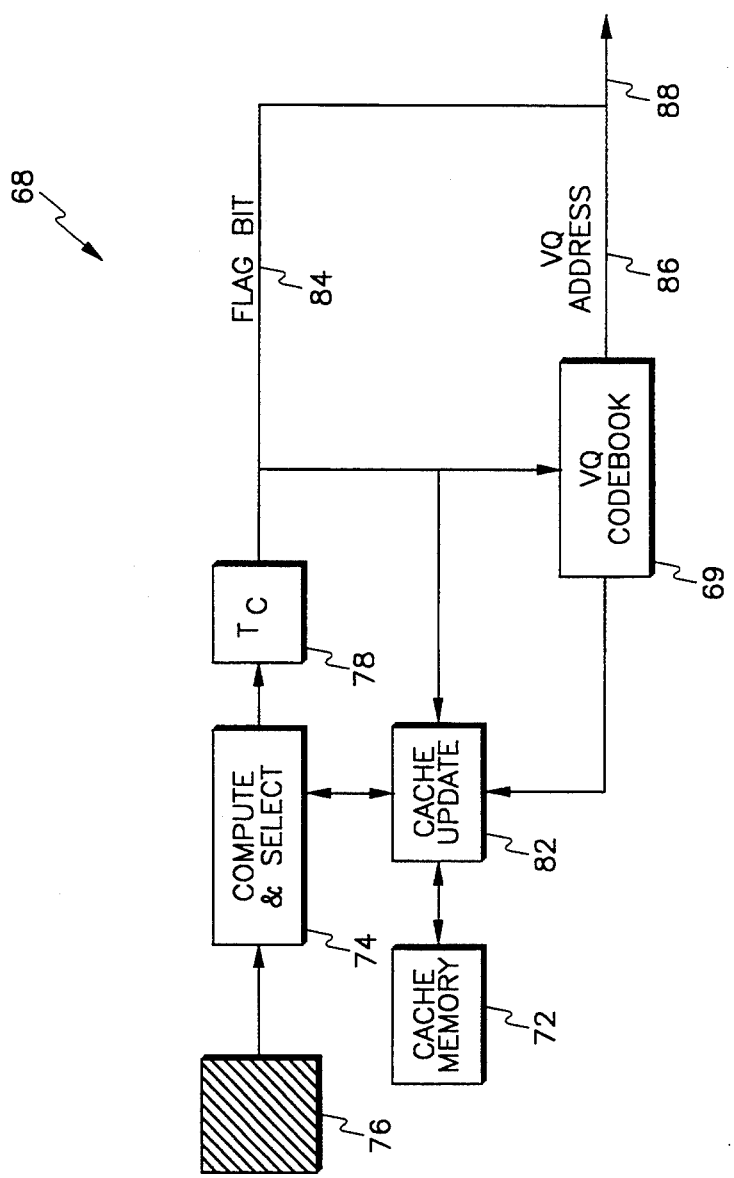
FIG. 9 is a block diagram of a cache vector quantizer for encoding a new frame of a video sequence in the frame buffer of the hierarchical source encoding system of FIG. 1.

If the p/8×p/8 image block 21''' has not yet been encoded, then it is passed onto a block encoder 19 shown in FIG. 9. The block encoder may be a vector quantizer, a transform encoder, a subband encoder, or any other suitable block encoder. Transform encoding and subband encoding are described in the background section hereinbefore. Examples of vector quantizers which are suitable for the present invention are described in A. Gersho, "Asymptotically optimal block quantization," *IEEE Trans. Information Theory*, vol. 25, pp. 373-380, July, 1979; Y. Linde, A. Buzo, and R. Gray, "An algorithm for vector quantization design," *IEEE Trans. Commun.*, vol. 28, pp. 84-95, January, 1980; R. M. Gray, J. C. Kieffer, and Y. Linde, "Locally optimal quantizer design," *Information and Control*, vol. 45, pp. 178-198, 1980. All of the foregoing disclosures are incorporated herein by reference as if set forth in full hereinbelow. It should be further noted that entropy encoding may be employed in a vector quantizer 19 to further enhance data compression.

In regard to the well known entropy encoding, also known as variable length encoding, indices within the cache 36 may be entropy encoded in order to further enhance data compression. In entropy encoding, the statistics of an occurrence of each cache index are considered, and the number of bits for encoding each index may vary depending upon the probability of an occurrence of each index.

Cache Vector Quantizer

During initialization of the hierarchical source encoding system 10, a new image frame must be created in the frame buffer 28 of the present invention. This situation can occur, for example, when the hierarchical source encoding system 10 is first activated or when there is a scene change in the video sequence.

For this purpose, a novel vector quantizer 68 shown in FIG. 9 has been developed using the novel cache memory principles. The cache vector quantizer 68 comprises a large main VQ codebook 69 which is designed off-line and a small codebook kept in a cache memory 72 whose entries are selected on-line based on the local statistics of the image being encoded. Similar to the cache memory 36 of the motion encoders 13, 15, 17, the cache memory 72 is replenished with preferably the stack algorithms LRU, LFU, FIFO, or a novel adaptive working set model algorithm, which will be discussed in further detail later in this document.

In architecture, the cache vector quantizer 68 includes the large VQ codebook 69, the cache memory 72, a compute-and-select mechanism 74 for receiving the incoming p×p image block 76 and for comparing the image block 76 to code vectors in the cache memory 72, a $T_c$ threshold mechanism 78 for determining whether the minimum distortion vector is below a predetermined threshold $T_c$, and a cache update mechanism 82 which utilizes a cache stack replacement algorithm for updating the cache memory 72. More specifically, the compute-and-select mechanism 74 performs the following equations:

$$d_k(x,z) = \sum_{i=1}^{P} \sum_{j=1}^{P} (x_{ij} - z_{ij}^k)^2 \tag{5}$$

$$d_{kc}(x,z) = \min \{d_k(x,z)\} \tag{6}$$

where x is the input block 76, $z^1, z^2, z^3, \ldots z^L$ are the code vectors in the cache memory 72, where $k_c$ is the selected cache index, and where $1 < k < L$.

The $T_c$ threshold mechanism 78 determines whether the minimum distortion motion vector $d_{kc}$ is below the threshold $T_c$. If so, then a flag bit 84 is set at a logic high indicating a cache hit, and the flag bit 84 is output along with the VQ address 86, as indicated by a reference arrow 88. Alternatively, if the minimum distortion $d_{kc}$ is greater than or equal to the threshold $T_c$, indicating a cache miss, then the main VQ codebook 69 is consulted.

Preferably, the main VQ codebook 69 is set up similar to the small codebook within the cache memory 72, and compares entries to determine a minimum distortion as with the small codebook. It should be noted, however, that other well known VQ methods can be implemented in the main VQ codebook 69. As examples, the following architectures could be implemented: (1) mean removed VQ, (2) residual VQ, and (3) gain/shape VQ.

The cache update mechanism 82 implements a stack replacement algorithm for the cache memory 72. In addition to the LRU, LFU, and FIFO stack replacement algorithms discussed in detail previously, the cache update mechanism 82 can perform a novel adaptive working set model algorithm described hereafter.

It should be further noted that entropy encoding, transform encoding, for example, discrete cosine transform (DCT) encoding, and subband encoding may be employed in the cache vector quantizer 68 to further enhance data compression.

Adaptive Working Set Model Technique

The cache size n discussed thus far relative to cache memory 36, 72 has been fixed throughout the process of encoding a particular image block. For most natural images, the rate of cache misses in the regions of low detail is much smaller than in high detail regions. Thus, more bit rate reduction could be achieved if the cache size n were allowed to vary according to the activity of the image blocks. In the adaptive working set model technique, an adaptive cache with a flexible cache size is efficiently implemented and results in a lower bit rate than is achievable using other conventional cache stack replacement algorithms, for example, LRU, LFU, and FIFO as discussed previously.

Figure 10:
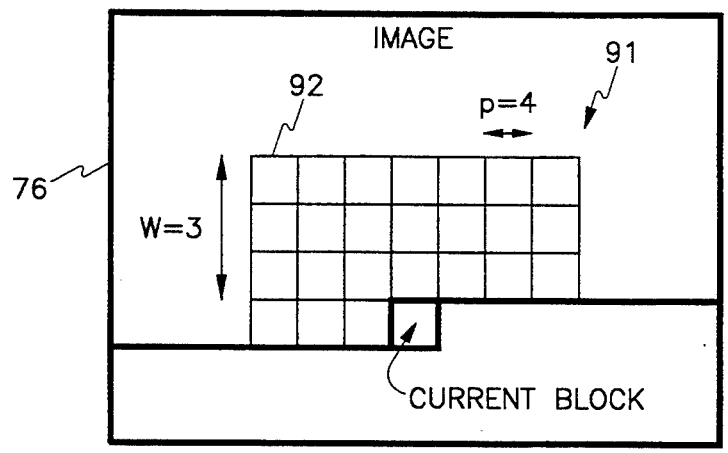
FIG. 10 is a graphical illustration showing a working set model for the cache memory of FIG. 9.

To understand the adaptive working set model technique, a brief discussion of the conventional working set model technique is warranted. In the conventional working set model technique, no particular cache stack replacement technique is utilized, and the cache memory is simply a list of the unique code vectors that occur during the near past $[t-\tau+1, t]$, where parameter $\tau$ is known as the window size. The parameter $\tau$ can be a function of time. The ultimate cache size corresponds to the number of unique code vectors within the time interval. For an image source, a two-dimensional causal search window 91 can be defined, as illustrated in FIG. 10, which conceptually corresponds to the time interval of the working set model. In other words, as shown in FIG. 10, the memory space in the cache memory 72 (FIG. 9) is defined as all the blocks within the causal search window 91. As an example, the causal search window 91 is shown having a size W equal to three rows of blocks 92, each with a block size p×p of 4×4. The resulting code vector for encoding each image block x(t) is the previous block in the causal search window 91 that yields the minimum distortion, such as the minimum MSE distortion. For a given causal search window 91 having size W, the total number M of possible code vectors is given by the following equation:

$$M = (2W+1)W + W \quad (7)$$

One of the major advantages of the working set model for computer memory design over other replacement algorithms is the ability to adapt the size of the causal search window 91 based on the average cache miss frequency, which is defined as the rate of misses over a short time interval. Different window sizes are used to execute different programs, and the working set model is able to allocate memory usage effectively in a multiprogramming environment.

The adaptive working set model of the present invention uses the foregoing ideas to implement variable-rate image encoding. Different regions of an image require different window sizes. For example, an edge region may require a much larger search window 91 than that of shaded regions. Accordingly, a cache-miss distance is defined based on the spatial coordinates of each previously-encoded miss-block in the causal window 91 relative to the present block being encoded.

Figure 11:
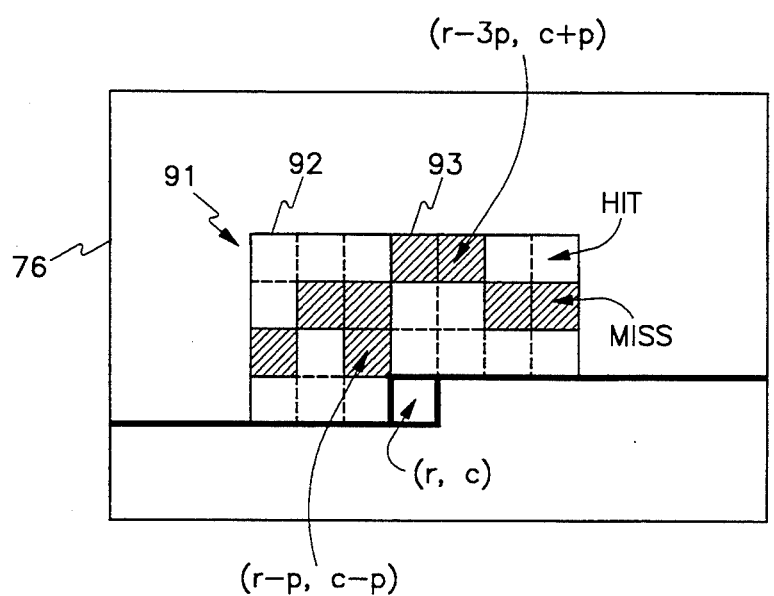
FIG. 11 is a graphical illustration showing a novel adaptive working set model for the cache memory of FIG. 9.

More specifically, let $N(W_f, r, c)$ be the set of indices of the miss-blocks where $W_f$ is the window size used to estimate the cache-miss distance. The spatial coordinates of the set $N(W_f, r, c)$ are illustrated in FIG. 11 as the shaded blocks 93. The average cache-miss frequency is defined as the summation of the reciprocal of each cache-miss distance within the search window:

$$f_m = \sum_{(i,j) \in N(W_f, r, c)} \frac{1}{|i - r| + |j - c|} \quad (8)$$

where r is the row index and c is the column index. This value provides a good enough estimate of the image locality at any given region without requiring a large amount of computation.

The window size W at a given time t is updated according to the following equation:

$$W(t) = \begin{cases} A 2^{f_m B} & \text{if } W(t) < W_{max} \\ W_{max} & \text{otherwise} \end{cases} \quad (9)$$

where A and B are two pre-defined constants, and $W_{max}$ is the pre-defined maximum allowed window size.

Hence, in the adaptive working set model technique, the size of the causal search window 91 is manipulated depending upon the miss frequency. As misses increase or decrease, the window 91 respectively increases or decreases.

In accordance with another aspect of the present invention, redundant blocks within the causal search window 91 are preferably minimized or eliminated. More specifically, if a present block matches one or more previous blocks in the causal search window 91, then only a code vector representative of the offset to the most recent block is encoded for designating the present block. This aspect further enhances data compression.

Localized Scanning of Cache Indices

Figure 12:
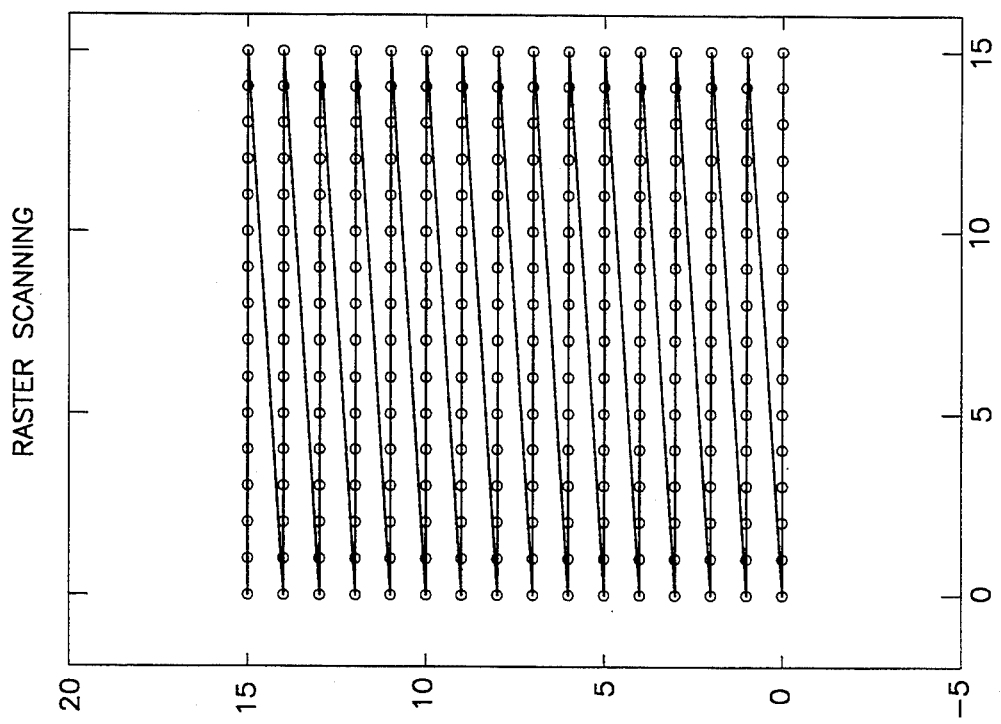
FIG. 12 is a graphical illustration showing a raster scan technique for scanning the image blocks in one image frame.

The method used to index the image blocks in a single image frame can also affect the average cache bit rate because the cache memory 72 updates its contents based entirely on the source vectors that have been encoded in the near past. The indexing of image blocks may be based on a raster scan, as illustrated in FIG. 12. FIG. 12 shows an example of a raster scan for scanning 256 image blocks. The major problem with this method is that each time a new row begins, the inter-block locality changes rapidly. Moreover, if the cache size is very small relative to the number of vectors in a row, many cache misses will occur whenever the cache starts to encode the source vectors in a new row.

Figure 13:
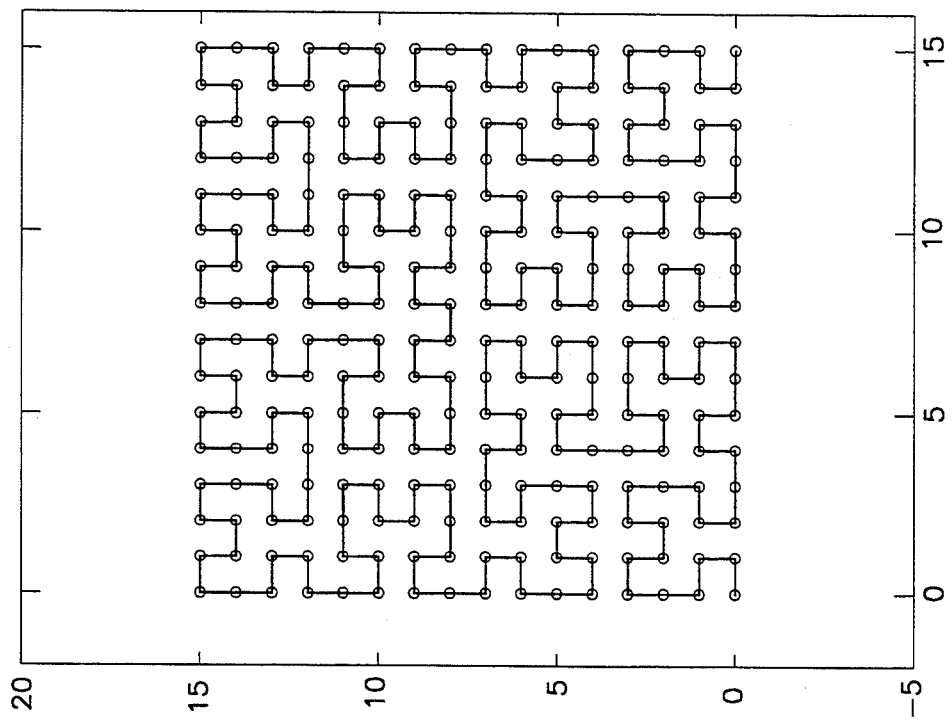
FIG. 13 is a graphical illustration showing a localized scanning technique for scanning the image blocks in one image frame.

In the preferred embodiment, the image blocks are indexed for higher performance by providing more interblock locality. In this regard, a localized scanning technique, for example, the conventional Hilbert scanning technique, is utilized for indexing the image blocks of the image frame. FIG. 13 illustrates the Hilbert scanning technique as applied to the indexing of the image blocks of the image frame of the present invention for scanning 256 image blocks.

It will be obvious to those skilled in the art that many variations and modifications may be made to the above-described embodiments, which were chosen for the purpose of illustrating the present invention, without substantially departing from the spirit and scope of the present invention. For example, the hierarchical source encoding system 10 was specifically described relative to decomposition of square image blocks of particular sizes. Obviously, to one of skill in the art, any block configuration and size may be utilized to practice the present invention. All such variations and modifications are intended to be included herein within the scope of the following claims.

Wherefore, the following is claimed by the inventors:

1. A method for efficiently compressing source image blocks from a source image, comprising the steps of:
   (a) storing cache image blocks as cache code vectors in a cache memory;
   (b) performing a comparison between a source image block and a cache code vector;
   (c) if said source image block matches said code vector, identifying a cache index which corresponds to said matched code vector and which is smaller in data size than said matched source image block;
   (d) using said cache index to encode said code vector by communicating said cache index as a representation of said code vector so that said source image block is effectively compressed to said cache index; and
   (e) updating said cache memory based upon a cache stack replacement algorithm and said comparison by the following steps:
      (1) when said source image block matches said code vector, reordering said cache code vectors; and
      (2) when said source image block fails to match said code vector, generating a new code vector corresponding to said source image block and adding said new code vector to said cache memory.

2. The method of claim 1, further comprising the step of updating said cache memory using a working set model having a causal search window with a selectable size.

3. The method of claim 1, wherein the cache stack replacement algorithm used to update the cache memory in said step (e) is a least-recently-used LRU) stack replacement algorithm.

4. The method of claim 1, wherein the cache stack replacement algorithm used to update the cache memory in said step (e) is a least-frequently-used (LFU) stack replacement algorithm.

5. The method of claim 1, wherein the cache stack replacement algorithm used to update the cache memory in said step (e) is a first-in-first-out (FIFO) stack replacement algorithm.

6. A hierarchical encoding method for efficiently compressing image blocks from an image, comprising the steps of:
   (1) comparing a present image block with a corresponding previously encoded image block and if the present image block is substantially similar to said corresponding previously encoded image block, terminating the hierarchical encoding method for said present image block by setting a first flag, or else, continuing to step (2);
   (2) decomposing said present image block into smaller present image subblocks;
   (3) comparing a present image subblock with a corresponding previously encoded image subblock of comparable size and if said present image subblock is substantially similar to said corresponding previously encoded image subblock, encoding said present image subblock by setting a second flag, or else, continuing to step (4);
   (4) comparing said present image subblock with displaced image subblocks, which are formed by displacing previously encoded subblocks by motion vectors stored in a cache memory, to derive a first minimum distortion motion vector, and if said first minimum distortion motion vector is below a first predetermined threshold, encoding said present image subblock by setting a third flag and by generating a cache index corresponding to said first minimum distortion vector and said present image subblock, or else, continuing to step (5);
   (5) comparing said present image subblock with said previously encoded image subblocks of comparable size to derive a second minimum distortion motion vector, and if said second minimum distortion motion vector is below a second predetermined threshold, encoding said present image subblock by setting a fourth flag, and updating said cache memory, or else, continuing to step (6); and
   (6) encoding said present image subblock using a block encoding technique.

7. The method of claim 6, wherein said block encoding technique uses vector quantization.

8. The method of claim 7, wherein said vector quantization uses a second cache memory which is updated by a stack replacement algorithm.

9. The method of claim 7, further comprising the step of updating said second cache memory using a stack replacement algorithm.

10. The method of claim 7, further comprising the step of updating said second cache memory with another codebook.

11. The method of claim 7, further comprising the step of indexing said image blocks of said image via a localized scanning technique.

12. The method of claim 6, further comprising the steps of:
   after step (4), decomposing said present image subblock into smaller present image subblocks; and
   repeating steps (4) and (5) on a subblock of said smaller present image subblocks.

13. The method of claim 6, further comprising the step of updating said cache memory using a least-recently-used (LRU) stack replacement algorithm.

14. The method of claim 6, further comprising the step of updating said cache memory using a least-frequently-used (LFU) stack replacement algorithm.

15. The method of claim 6, further comprising the step of updating said cache memory using a first-in-first-out (FIFO) stack replacement algorithm.

16. The method of claim 6, wherein step (2) uses a quadtree decomposition technique.

17. The method of claim 6, wherein step (5) uses a full search technique wherein substantially all of said smaller subblocks within said present image block are compared with said subblock to derive said second minimum distortion motion vector.

18. The method of claim 6, wherein step (5) uses a log search technique for comparing said subblock to said smaller subblocks to derive said second minimum distortion motion vector.

19. The method of claim 6, wherein said block encoding technique uses transform encoding.

20. The method of claim 6, wherein said block encoding technique uses subband encoding.

21. The method of claim 6, further comprising the step of updating said cache memory using a stack replacement algorithm.

22. The method of claim 6, further comprising the step of updating said cache memory using a working set model having a causal search window with a selectable size.

23. An encoding system for compressing motion vectors which represent displacements of image blocks, comprising:
   a cache memory for storing motion vectors with corresponding cache indices;
   means for performing comparisons between a present image block and previously encoded image blocks of comparable size and for identifying a motion vector representative of a displacement of said present image block from a previously encoded image block, said means for comparing said motion vector with one of said motion vectors in said cache memory, said means for identifying a cache index representative of said motion vector if said motion vector matches said one of said motion vectors, said cache index being smaller in data size than said motion vector so that said motion vector is effectively compressed to said cache index; and
   a stack replacement means for updating said cache memory based upon said comparisons, said stack replacement means for:
   (1) when said motion vector matches said one of said motion vectors, reordering said motion vectors within said cache memory; and
   (2) when said motion vector fails to match said one of said motion vectors, generating a new motion vector corresponding to said present image block and adding said new motion vector to said cache memory.

24. The system of claim 23, further comprising a means for updating said cache memory using a working set model having a causal search window with a modifiable size.

25. The system of claim 23, wherein said stack replacement means performs a least-recently-used (LRU) method to update said cache memory.

26. The system of claim 23, wherein said stack replacement means performs a least-frequently-used (LFU) stack replacement algorithm to update said cache memory.

27. The system of claim 23, wherein said stack replacement means performs a first-in-first-out (FIFO) stack replacement algorithm to update said cache memory.

28. The system of claim 23, wherein image blocks of said image are indexed via a localized scanning method.

29. A hierarchical encoding system for efficiently compressing image blocks from an image by performing a hierarchical encoding method, comprising:

(1) first means for comparing a present image block with a corresponding previously encoded image block and if the present image block is substantially similar to said corresponding previously encoded image block, encoding said present image block by setting a first flag, or else, continuing to step (2);

(2) second means for decomposing said present image block into smaller present image subblocks;

(3) third means for comparing a present image subblock with a corresponding previously encoded image subblock of comparable size and if said present image subblock is substantially similar to said corresponding previously encoded image subblock, encoding said present image subblock by setting a second flag, or else, continuing to step (4);

(4) fourth means for comparing said present image subblock with displaced image subblocks formed by displacing said previously encoded subblocks by motion vectors stored in a cache memory to derive a minimum distortion motion vector, and if said minimum distortion vector is below a first predetermined threshold, encoding said present image subblock by setting a third flag and generating a cache index corresponding to said present image subblock, or else, continuing to step (5);

(5) fifth means for comparing said present image subblock with said previously encoded image subblocks of comparable size to derive a second minimum distortion motion vector, and if said second minimum distortion vector is below a second predetermined threshold, encoding said present image subblock by setting a fourth flag and updating said cache memory, or else, continuing to step (6); and (6) sixth means for encoding said present image subblock using a block encoding technique.

30. The system of claim 29, wherein said block encoding technique uses vector quantization.

31. The system of claim 30, wherein said vector quantization uses a second cache memory which is updated by a stack replacement algorithm.

32. The system of claim 29, further comprising a least-recently-used (LRU) stack replacement algorithm for updating said cache memory.

33. The system of claim 29, further comprising a least-frequently-used (LFU) stack replacement algorithm for updating said cache memory.

34. The system of claim 29, further comprising a first-in-first-out (FIFO) stack replacement algorithm for updating said cache memory.

35. The system of claim 29, wherein second means uses a quadtree decomposition technique.

36. The system of claim 29, wherein said fifth means further comprises a full search means for performing a full search technique wherein substantially all of said smaller subblocks within said present image block are compared with said subblock to derive said second minimum distortion motion vector.

37. The system of claim 29, wherein said fifth means further comprises a log search means for performing a log search when comparing said subblock to said smaller subblocks to derive said second minimum distortion motion vector.

38. The system of claim 29, further comprising a means for updating said cache memory using a working set model having a causal search window with a selectable size.

39. The system of claim 29, further comprising a means for entropy encoding said cache index.

40. The system of claim 29, wherein said block encoding technique uses transform encoding.

41. The system of claim 29, wherein said block encoding technique uses subband encoding.

42. A method for compressing image blocks from an image, comprising the steps of:

decomposing a present image block into smaller present image subblocks;

comparing a present image subblock with a corresponding previously encoded image block of comparable size and when said present image subblock is substantially similar to said previously encoded image subblock, representing said present image subblock with a first flag;

comparing said present image subblock with a displaced image subblock formed by displacing a previously encoded subblock by a motion vector stored in a cache memory to derive a first minimum distortion motion vector, and when said first minimum distortion motion vector is below a first predetermined threshold, generating a second flag and a cache index corresponding to said first minimum distortion vector and representative of said present image subblock; and comparing said present image subblock with said previously encoded image subblocks of comparable size to derive a second minimum distortion motion vector, and when said second minimum distortion motion vector is below a second predetermined threshold, representing said present image subblock by a third flag.

43. A method for compressing data using a cache memory with a stack replacement mechanism, comprising the steps of:

storing motion vectors in a cache memory with corresponding cache indices;

matching a present image block with a previously encoded image block and identifying a motion vector indicative of a displacement between said present image block and said previously encoded image block;

comparing said motion vector with one of said motion vectors in said cache memory and, if said motion vector matches said one of said motion vectors, identifying a cache index representative of said matched motion vector, said cache index being smaller in data size than said matched motion vector;

communicating said cache index as a representation for said present image block so that said present image block is compressed to said cache index; and updating said cache memory with a stack replacement algorithm, said stack replacement algorithm comprising the following steps:

(1) when said motion vector matches said one of said motion vectors, reordering said motion vectors within said cache memory; and (2) when said motion vector fails to match said one of said motion vectors, generating a new motion vector corresponding to said present image block and adding said new motion vector to said cache memory.

44. A system for compressing image blocks from an image, comprising:

means for comparing a present image block with a previously encoded image block and when said present image block is similar to said previously encoded image block, producing a flag indicative thereof;

means for comparing said present image block with displaced image blocks, which are formed by displacing previously encoded image blocks by motion vectors stored in a cache memory, to derive a minimum distortion motion vector, and when said minimum distortion motion vector is below a predetermined threshold, producing a cache index corresponding to said minimum distortion vector and said present image block; and wherein said flag and said cache index are smaller in data size than said present image block so that said present image block is compressed when said flag and when said cache index are produced as representative of said present image block.

45. A system for compressing image blocks from an image, comprising:

means for decomposing a present image block into smaller present image subblocks;

means for comparing a present image subblock with a corresponding previously encoded image block of comparable size, and when said present image subblock is substantially similar to said corresponding previously encoded image subblock, representing said present image subblock with a first flag;

means for comparing said present image subblock with displaced image subblocks, which are formed by displacing previously encoded image blocks by motion vectors stored in a cache memory, to derive a first minimum distortion motion vector, and when said first minimum distortion motion vector is below a first predetermined threshold, representing said present image subblock by a cache index corresponding to said first minimum distortion vector and generating a second flag indicative thereof;

means for comparing said present image subblock with said previously encoded image subblocks of comparable size to derive a second minimum distortion motion vector, and when said second minimum distortion motion vector is below a second predetermined threshold, representing said present image subblock by a third flag; and wherein said flags and said cache index are smaller in data size than said present image block so that said present image block is compressed when said flags and when said cache index are produced as representative of said present image block.

46. A system for compressing a source image block from a source image using a cache which is updated with a cache stack replacement technique, comprising:

(a) means for storing cache image blocks in a cache memory;

(b) means for comparing said source image block with a cache image block;

(c) means for compressing said source image block when said source image block matches said cache image block by representing said source image block with a cache index corresponding to said cache image block, said cache index being smaller in data size than said source image block so that said source image block is compressed to said cache index when said source image block is represented by said cache index; and means for updating said cache memory by:

(1) when said source image block matches said cache image block, reordering said cache image blocks; and (2) when said source image block fails to match said cache image block, generating a new cache image block corresponding to said source image block and adding said new cache image block to said cache memory.

* * * * *

UNITED STATES PATENT AND TRADEMARK OFFICE
CERTIFICATE OF CORRECTION

PATENT NO. : 5,444,489
DATED : August 22, 1995
INVENTOR(S) : Kwan K. Truong and Russell M. Mersereau It is certified that error appears in the above-indentified patent and that said Letters Patent is hereby corrected as shown below:

Column 7, line 63, before "threshold", insert --$T_M$--;

line 66, after "threshold", insert --$T_M$--;

line 68, after "threshold", insert --$T_M$--.

Column 8, line 7, after "threshold", insert --$T_M$--.

Signed and Sealed this

Seventeenth Day of October, 1995

Attest:

BRUCE LEHMAN

*Attesting Officer*     *Commissioner of Patents and Trademarks*